United States Patent [19]

Oppedahl

[11] Patent Number: 5,228,133
[45] Date of Patent: Jul. 13, 1993

[54] METHOD TO PERFORM TEXT SEARCH IN APPLICATION PROGRAMS IN COMPUTER BY SELECTING A CHARACTER AND SCANNING THE TEXT STRING TO/FROM THE SELECTED CHARACTER OFFSET POSITION

[76] Inventor: Carl Oppedahl, 27 W. 44th St., #28, New York, N.Y. 10035-6645

[21] Appl. No.: 591,068

[22] Filed: Oct. 1, 1990

[51] Int. Cl.⁵ ........................................... G06F 12/00
[52] U.S. Cl. .......................... 395/425; 364/DIG. 1; 364/550; 382/10
[58] Field of Search ............................ 395/400, 425; 364/200 MS File, 900 MS File; 382/37, 39, 40, 10, 11, 12

[56] References Cited

U.S. PATENT DOCUMENTS

| | | | |
|---|---|---|---|
| 4,003,025 | 1/1977 | Hilliard et al. | 382/39 |
| 4,531,201 | 7/1985 | Skinner | 364/419 |
| 4,556,951 | 12/1985 | Dickman et al. | 382/40 |
| 4,589,142 | 5/1986 | Bednar | 382/37 |
| 4,625,295 | 11/1986 | Skinner | 395/800 |
| 4,760,523 | 7/1988 | Yu et al. | 395/800 |
| 4,916,655 | 4/1990 | Ohsone et al. | 395/600 |
| 4,941,124 | 7/1990 | Skinner | 395/800 |
| 5,033,098 | 7/1991 | Tanaka et al. | 382/40 |
| 5,119,327 | 6/1992 | Skinner | 395/800 |
| 5,138,669 | 8/1992 | Shimura et al. | 382/37 |

*Primary Examiner*—Joseph L. Dixon
*Assistant Examiner*—F. J. Asta
*Attorney, Agent, or Firm*—Carl Oppedahl

[57] ABSTRACT

An improved method for text searching has application to application programs in computers, where the application program handles files written in a language. Advantageously a character within the first string is selected. In the general case the character selected is a relatively rarely used character in the language, and in simplified cases it is selected as non-alphabetic or as found within a set of characters known to be relatively rarely used.

The file is then scanned, starting not at the beginning but rather from a position offset from the beginning of the file according to the position of the selected character within the first string. In the event of a match for that character, the remainder of the character positions of the first string are compared for a string-length match. The scanning terminates at a position short of the end of the file according to the position of the selected character within the first string, or terminates on a string-length match. The speed of a text search within a file is improved by an order of magnitude or more, and sometimes by two orders of magnitude.

8 Claims, 4 Drawing Sheets

METHOD TO PERFORM TEXT SEARCH IN APPLICATION PROGRAMS IN COMPUTER BY SELECTING A CHARACTER AND SCANNING THE TEXT STRING TO/FROM THE SELECTED CHARACTER OFFSET POSITION

BACKGROUND OF THE INVENTION

Every word processing program has a "find" feature, and it takes some time for the feature to find what is sought. This invention relates generally to the facility of searching for and finding a particular group of characters, called a "string", within a larger string or an entire file. The invention has particular benefits for computers executing applications that manipulate files containing text written in a particular language, including word processing application programs and programming languages.

In a computer that is executing a typical word processing program, the user can type a key command for finding a string within a file. For example, with the Sprint word processor executing on an industry standard architecture personal computer, the user can press the F7 function key, and the legend Forward search: appears on the screen. The user types, say, "the", and the result from the user's point of view is that the cursor of the program moves to a point on the screen where the word "the" appears. Concealed from the user is the detailed process within the computer whereby the search is accomplished. When the user types "the", the application program causes the computer to scan through the file, searching for a match between what was typed and successive three-character portions of the file.

Well known in the prior art is the technique almost universally employed in word processing applications and in programming languages. First, the computer inspects successive locations in the file for an occurrence of the letter t. When a t is found, the next location in the file is tested to see if it is an h. If it is, then the next location is tested to see if it is an e. If so, then the search has been finished. (A commonly used slang is that there has been a "hit".) If the h or e test fails, then the search will have to continue. The next occurrence of a t is found, and the h test is performed again. If the h test is satisfied, then the e test is performed again, and so on.

In many word processing applications a more broad search is available, namely a search that accepts a match that is insensitive to case. In such a broad search, for example, the user may type "the" and the program will announce a "hit" if it finds, say, "The." For such a broad search, the procedure followed by the computer involves inspection of successive locations in the file, but each location is tested not only to see if it is a t but also to see if it is a T. The h and e comparisons likewise also require tests to see if the candidate position contains a case-equivalent character, i.e. H for h or E for e.

Where the file to be searched is small—only a few hundred or a few thousand characters in length—the search time need not be unduly long. With modern processor speeds and RAM (random access memory) response times, a search of several thousand positions can be finished by the time the user's finger has lifted from the final keystroke of the search command. Even where the file is on disk rather than in RAM, the search time is small when compared to other delays. Even the time to redraw the screen to show where the desired text was found may be comparable in length to the search time.

Where the file to be searched is large, however, search times become relevant. For about a decade, users of personal computers have found it unremarkable to edit and manipulate text files of a megabyte or more in length. Searching in megabyte-sized files can take tens of seconds or even minutes. For an indication of the importance of this delay, consider that the time required to search a large file for a string (group of characters) is something software reviewers often measure when comparing text processing application programs.

Two general approaches have been employed in the prior art to cut down on the execution time of text searches. The first is to make judicious use of assembly language for such searches, even if the rest of the application is written in a higher level language. It is well known that tight coding in assembly language offers speed enhancements over compiled languages such as FORTRAN, Pascal, and C, and offers even greater enhancements over interpreted languages such as BASIC and dBase.

A second approach is to optimize the software task by reallocating the hardware details of the task. Inspecting successive positions within a file goes slowly for floppy disks, somewhat faster for hard disks, and quite quickly for RAM. Thus in text processing applications if the available RAM is large enough the file may be copied to a RAM disk or to RAM allocated within the space allocated to the application by DOS (disk operating system). The search is performed in RAM, where it goes more quickly than it would from disk.

Neither of these approaches is quite satisfactory for the range of real-life text manipulations which users have become accustomed to in the last decade. Even with very fast CPUs (central processing units) and recently released word processing programs, a search in a large file can take many tens of seconds. The time required for the search is much greater (as will be seen below, it is generally doubled) where the match is to be case-insensitive.

SUMMARY OF THE INVENTION

In accordance with the invention, there is disclosed an improved method for text searching is disclosed, having application to application programs in computers, where the application program handles files written in a language. Depending on the string being searched for, search time may be cut in half or more, an improvement that goes directly to time saved for the human user.

In the text search method of the invention, advantageously a character within the first string is selected. In the general case the character selected is a relatively rarely used character in the language, and in simplified cases it is selected as non-alphabetic or as found within a set of characters known to be relatively rarely used.

The file is then scanned, starting not at the beginning but rather from a position offset from the beginning of the file according to the position of the selected character within the first string. In the event of a match for that character, the remainder of the character positions of the first string are compared for a string-length match. The scanning terminates at a position short of the end of the file according to the position of the selected character within the first string, or terminates on a string-length match.

BRIEF DESCRIPTION OF THE DRAWING

The invention will be described in some detail with respect to a drawing, of which.

DETAILED DESCRIPTION

Figures 1, 2, 4:
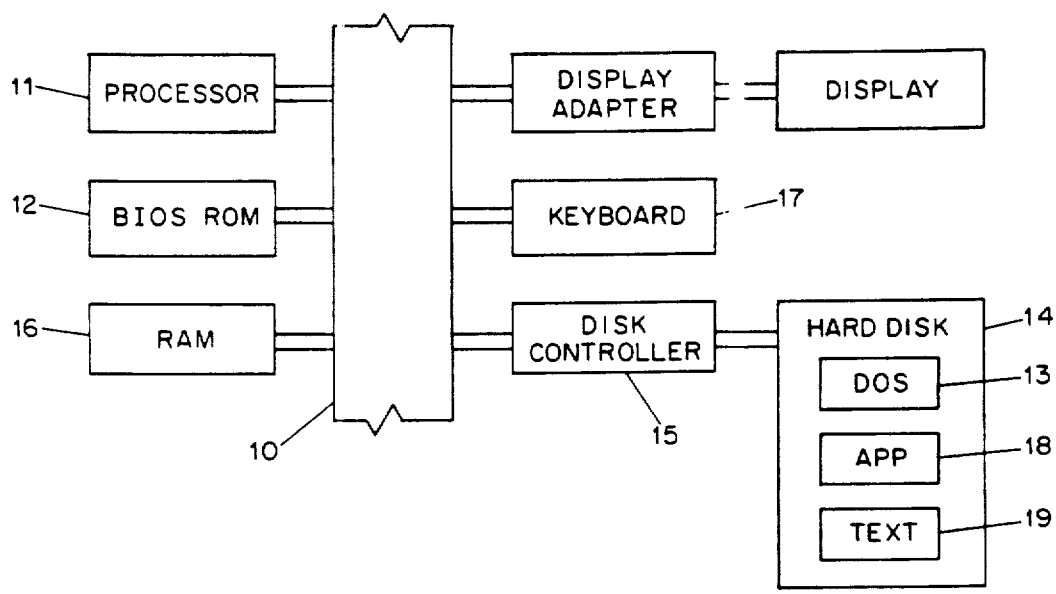
FIG. 1 shows a functional block diagram of a computer system of the type in connection with which text searching is performed.
FIG. 2 shows a typical file within which text searching may take place, together with a match string.
FIG. 4 shows a match string after performing the step, according to the invention, of selecting a position within the match string according to a predetermined criterion.

FIG. 1 shows a functional block diagram of a typical computer system of the type in connection with which text searching is performed. Parallel address, data, and control bus 10 interconnects all other portions of the system. At power-up processor 11 executes stored program from BIOS ROM (basic input/output system read-only memory) 12, including instructions permitting control of disk controller 15 so as to load the kernel of disk operating system (DOS) 13, stored in hard disk 14, into RAM 16. Control is then passed to the DOS kernel in RAM 16.

In response to commands entered by the user at keyboard 17, DOS loads an application 18 from hard disk 14 into RAM 16, and control passes to the application. The user indicates to the application the name of a text file 19 on hard disk 14 which is to be manipulated.

To illustrate the invention, it is assumed the application is one in which the user may wish to search the text file 19 for the location of a particular string, called a "match string". FIG. 2 shows in linear form the contents of a typical text file such as that at file 19 in FIG. 1. For purposes of illustration the character positions in the file are numbered; the first position contains the ASCII (American Standard Code for Information Interchange) value for an upper-case T, namely the number 84 (decimal). For simplicity of description it will be said that the first position of the file "contains" the character "T", and it will be understood herein that on a hardware level this means the associated ASCII value is present. The second position contains an "h" (ASCII 104) and so on. In the figure many character positions are omitted; a portion near position 500 is shown, along with the last few positions, here ending with position 903.

FIG. 2 shows the file with no indication of the particular method of storage at a hardware level, and as will be seen the teaching of the invention applies to any and all storage formats. In the example given here the file is a hard disk file, with the data stored in sectors which may or may not be contiguous and sequential physically. Logically, however, and as made available to the application, the file is neither more nor less than 903 values, each here understood to represent an ASCII character. For purposes of illustrating the invention the file could just as well be a sequence of memory locations in a region of RAM allocated to the application, or could just as well be a sequence of memory locations in RAM allocated to a RAM virtual disk.

Also shown in FIG. 2 is the match string—here a sequence of eight bytes, each indicative of an ASCII character. With the information visible in FIG. 2 it is immediately seen by visual inspection that the match starts at position 500, where the "H" matches the "H", the "a" matches the "a", and so on. However, the discussion centers on the computer's finding a match, and it is assumed that the computer, as it executes the application, does not have any special knowledge about where, in the file, the match may be, or even if there is a match.

An everyday example of how the search depicted in FIG. 2 comes to be performed is the "find" feature of a word processor. With one popular and generally well-designed word processor, the user presses the F7 function key. The word processor, which is the application being executed, asks the user the query "Forward search:". The user presses the eight keystrokes of the match string, and presses the "Enter" key. The software moves sequentially through the file starting at the beginning of the file, looking for a match. As will be described in more detail below, the match is found at position 500. The application moves the cursor to position 500, then redraws the screen if necessary to display the contents of the file at and nearby to the new cursor position.

One skilled in the art will appreciate that the search, though described here and below as a search of the entire file starting at the beginning, could equally well be initiated from the current cursor position which might be anywhere in the file.

Figure 3:
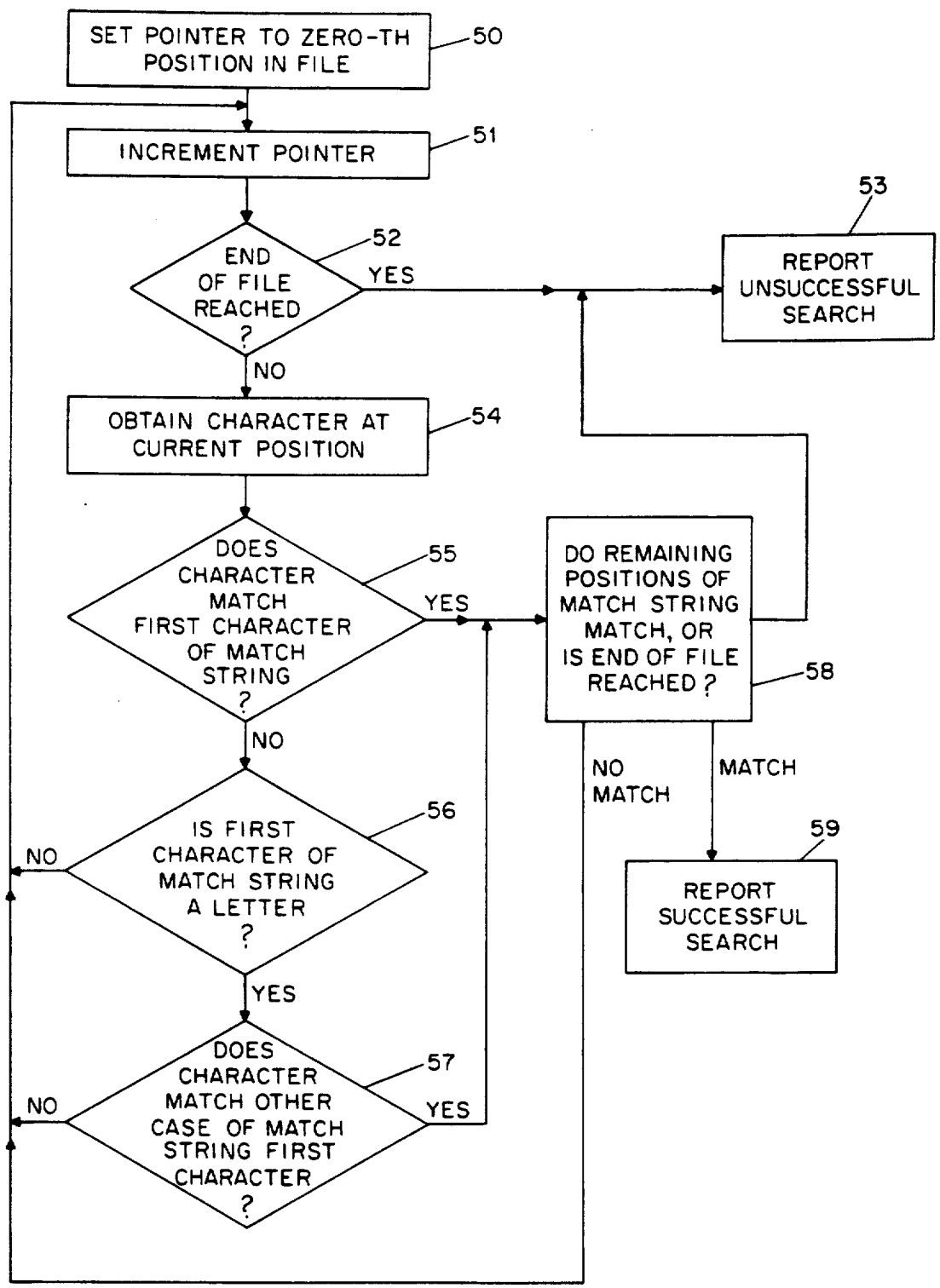
FIG. 3 in flowchart form a typical prior art text search routine.

FIG. 3 shows a flowchart of a typical routine employed in prior art applications to find a match of the type depicted in FIG. 2. First a pointer, which defines the current position in the file, is set at block 50. At block 51 the pointer is incremented, and at 52 a test is made to determine whether the end of file has been reached. If it has, then the search was unsuccessful and this outcome is reported at block 53 to the calling routine of the application. The more frequent outcome is that the end of file has not yet been reached, and at block 54 the character at the current position is obtained.

The activity at block 54 is one example of a virtual activity—an activity depicted and described here with no reference to the hardware details thereof. In the simple case of a file in RAM, obtaining a character is an ordinary indexed load from memory. In the general case of a DOS file on an arbitrary device, obtaining a character is a subroutine call to DOS, with DOS handling all the hardware-dependent steps to retrieve the character. Where the file is on a hard disk 14, these steps include buffering the data in RAM so that the disk is only accessed when the next buffer-full of characters is needed.

Once the character has been obtained, a test is made at 55 to determine whether the character obtained matches the first character in the match string. In the example of FIG. 2, the first time block 54 is reached the "T" at position 1 is obtained, and the test at 55 determines that "T" does not equal "H".

In most applications, and particularly in most word processor software, it is desired to be able to make the search case-insensitive. In a case-insensitive search, a search for "the" will find not only "the" but also "The" and "THE". (In most such applications, the user has the choice of making the search case-sensitive or case-insensitive.) A consequence of this is that if the first character of the match string is a letter (as distinguished from a numeral or other non-letter character) then it is not enough to make the comparison of block 55. One must also make a comparison between the character obtained from the file and the "other case" of the first character of the match string. In the example of FIG. 2, this means that after the (unsuccessful) comparison of "H" and "T" has been performed in block 55, the other case for "H", namely a lower-case "h", also must be compared with "T" to see if there is a match. The latter comparison takes place at block 57, while block 56 is the intermediate check to see if the character that was being matched was a letter.

More often than not, the tests of blocks 55 and 57 represent unsuccessful matches, and control returns to block 51 with the incrementing of the pointer. Sooner or later the end of file is reached, in the event that there is no match.

Skipping over much of the searching in the example of FIG. 2, let us consider what happens when position 500 is reached. The test at 55 is successful, so control passes to block 58, where the remainder of the match string is checked for match with the next few positions in the file. In the example of FIG. 2 the eight positions of the match string match the 500th through 507th positions of the file, and a successful search is reported at block 59.

It might be thought that the computation of block 58 has only two possible outcomes—a successful match of the remaining positions or not. But another outcome may happen—the match of block 55 (or block 57) may be at a position too close to the end of the file, so that one of the characters of the match string is being compared with the last character of the file, with at least one remaining character of the match string yet unmatched. Thus in the flowchart of FIG. 3 the third outcome, namely that end-of-file (EOF) has been reached, is shown.

Those skilled in the art will realize that a logically equivalent programming technique is to make the test at block 52 more sophisticated, namely to test not whether end-of-file was reached but rather whether the current position is closer t the end of the file than the length of the match string. This is possible, obviously, only if the application is given (e.g. by DOS) a way to find out the length of the file, or the number of characters remaining between the current position and the end of file.

The match at position 500 was described above with intentional omission of the discussion of the intervening search activity. This intervening activity will now be discussed in some detail. Consider, for example, what happens when the pointer has reached position 2. The character obtained at the current position is "h". This makes a match at block 57, and the routine then performs the activities of block 58.

To the reader who has the luxury of a visual scan of FIG. 2, it is obvious that positions 2 through 9 of the file come nowhere close to matching the eight positions of the match string. By definition the application does not, however, have this information. The routine at block 58 does have to be performed, at least to the extent necessary to determine, say, that position 2 of the match string fails to match (in either upper or lower case) the character at position 3 of the file. There being no match, the pointer is again incremented at block 51.

Much attention has been paid to attempting to reduce the execution time for a search when the prior art techniques of FIG. 3 are employed. One popular word processor, most of which is written in C, employs carefully written and tightly coded assembly language to reduce to a minimum the execution time of a search along the lines of that shown in FIG. 3. But even where assembly language is used, a text search in a large file can take tens of seconds or even minutes. Experiments with popular applications and files selected to be tens of megabytes in size show text search durations of several minutes or more.

In retrospect, given the teachings of the invention described herein, there are two factors which might seem obvious in accounting for much of the duration of a text search. One factor is that the loop of blocks 51, 52, 54, 55, 56, and 57 is executed once for each character in the file, and no matter how tightly written the code may be its execution time must be multiplied by the number of characters in the file to get a lower bound on the duration of the search. Time could be saved if the case-insensitive search (which appears to require both the comparisons of blocks 55 and 57) could be performed in such a way that the loop executed once for each character in the file were a quicker loop.

Another factor is that block 58, which is quite time-consuming in comparison with the loop of blocks 51, 52, 54, and so on, is generally executed many times prior to the successful search, if any, reported in block 59. For example, in the file of FIG. 2 discussed above there came a time at position 2 of the file where a "false alarm" caused block 58 to be executed. The false alarm was that the "H" of the match string matched the "h" of the file. This meant the computer had no choice but to haul out the second through eighth positions of the match string, and to start comparing them with the next few positions of the file (following the "h"). Each of the false alarms contributes to the duration of the search. Time could be saved if there were a way to cut down on the number of false alarms.

As will be seen, a seemingly simple bit of work prior to the execution of the main loop of the text search, together with seemingly simple changes in the logic of the main loop, give striking reductions in the search duration. These changes are shown first in connection with FIG. 4. In FIG. 4, the match string is shown, corresponding to the match string of FIG. 2. A predetermined decision process is employed to select a character other than the first character of the match string. Here, the length of the match string is given as f, and in this example f=8. The character selected here (according to a criterion discussed below) is at position p, and in the example p=5.

Figure 5:
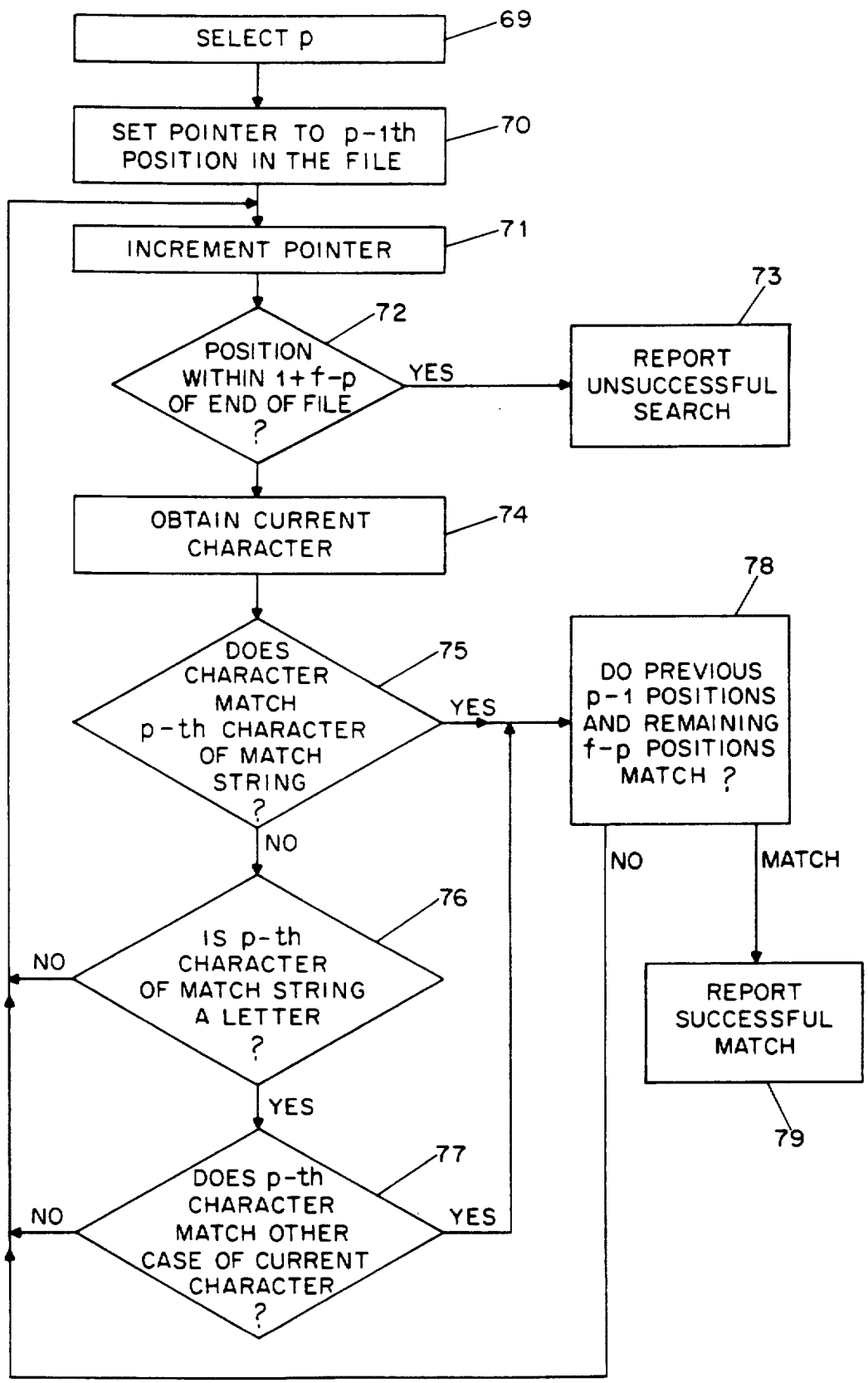
FIG. 5 shows in flowchart form an exemplary text search routine in accordance with the invention.

Turning now to FIG. 5, the text search routine corresponding to that of FIG. 3 is shown. At block 69 is shown the process of selecting p, which is the above case in p=5. At block 70 the pointer is set to the p-1th position of the file. At block 71 the pointer in incremented, and at block 72 a test is made to determine whether the current position is within 1+f−p positions of the end of the file. (The blocks 70-79 of FIG. 5 have reference designations chosen to be 20 larger than the reference designations 50-59 of roughly corresponding blocks of FIG. 3.). The current character is obtained at block 74, and a test is made at block 75 to see whether the p-th character of the match string matches the current character. Analogously to blocks 56 and 57 of FIG. 3, blocks 76 and 77 cover the case where the p-th character of the match string is a letter which has to be compared ignoring its case. Block 78, like block 58, compares the remainder of the match string with corresponding positions of the file, but block 78 differs in that part of what must be compared precedes the character that matched, that is, the character is position p of the match string. Blocks 79 and 73 report successful and unsuccessful matches, respectively, corresponding to blocks 59 and 53.

A comparison of the organization of the flowcharts of FIGS. 5 and 3 shows what might at first blush seem to be identical execution times. After all, the loop of blocks 51, 52, 54, 55, 56 and 57 which is so time-consuming has a visual counterpart in the flowchart of FIG. 5, namely blocks 71, 82, 74, 75, 76, and 77. Likewise the time-consuming block 58 has a visual counterpart in FIG. 5, namely block 78. If anything, the routine of FIG. 5 might seem likely to take longer, given the added execution time of block 69.

With reference back of FIG. 4, however, note the value of p, which in the example is 5. The p-th character is "9". "9" is not a letter, so the test of block 77 is skipped. As a result the loop of blocks 71, 82, 74, 75, and 76 takes less time to execute, and as it is executed (in the extreme case) as often as there are characters in the file, the time savings are substantial. Theory suggests, and experimentation confirms, savings of almost half in the duration of the search depending on the hardware file type and particulars of the processor and data bus.

In the example of FIG. 4, the selection criterion used for p was to select the first numerical character, in this case "9" where p=5. Numerical characters have the property, exploited here, that they have no upper or lower case. As a result the abovementioned benefit is that block 77 is bypassed. In much English text numerals are relatively uncommon as compared with letters, which also give the benefit that the number of false alarms (requiring execution of block 78) is reduced. Theory suggests, and experimentation confirms, savings of up to ten per cent in the duration of the search depending on the contents of the file.

In a preferred embodiment the selection procedure of block 69 can by any of the following:

If there is a numeral, select the numeral.
Select the letter most rarely used in common English.
If there is a rarely used character that is not a letter or numeral, use it.
Select the first non-letter if there is one.
For some predetermined set (e.g. rarely used letters or characters) select the first letter falling within the set.
For frequencies of use in some language (e.g. English) select the least frequently used letter from among those in the match string.
If the frequency distribution within the file is known or can be approximated, select p for the least frequently used character in the match string.

It might be thought that the best way to select the character from the match string is to select the one that is least frequent in the text language, or the one that is least frequent in the file to be searched. The former is computationally not difficult and does not take unduly long to perform, but the latter requires scanning the entirety of the file to extract character frequency-of-use information. If one where to scan the entirety of the file ahead of time one might just as well extract a concordance and use that for text searching.

From the point of view of selecting p so as to cut down on the search duration there are other methods that work almost as well as finding the character in the match string that is the least frequently used in the text language. For example, one can establish a predetermined set of, say, the ten or so least frequently used letters in the language of the text. (To draw an analogy to everyday experience, these would correspond roughly to those letters that have high point values in the well-know board game Scrabble.)

One then scans through the match string for the first occurrence of a character in that set. Such a scan does not take nearly so long as looking for the least frequently used letter anywhere in the match string, the second least frequently used letter anywhere in the match string, and so on. And yet it cuts down greatly the number of "false alarm" executions of block 78 since the p-th letter is by definition one that does not occur so terribly often.

If one is to select p so that the p-th character is a non-letter (generally a good thing to do as it avoids the case-checking of block 77) one should select a non-letter that is not very frequent in the file. For ordinary English text, for example, spaces are non-letters but occur quite often.

Figure 6:
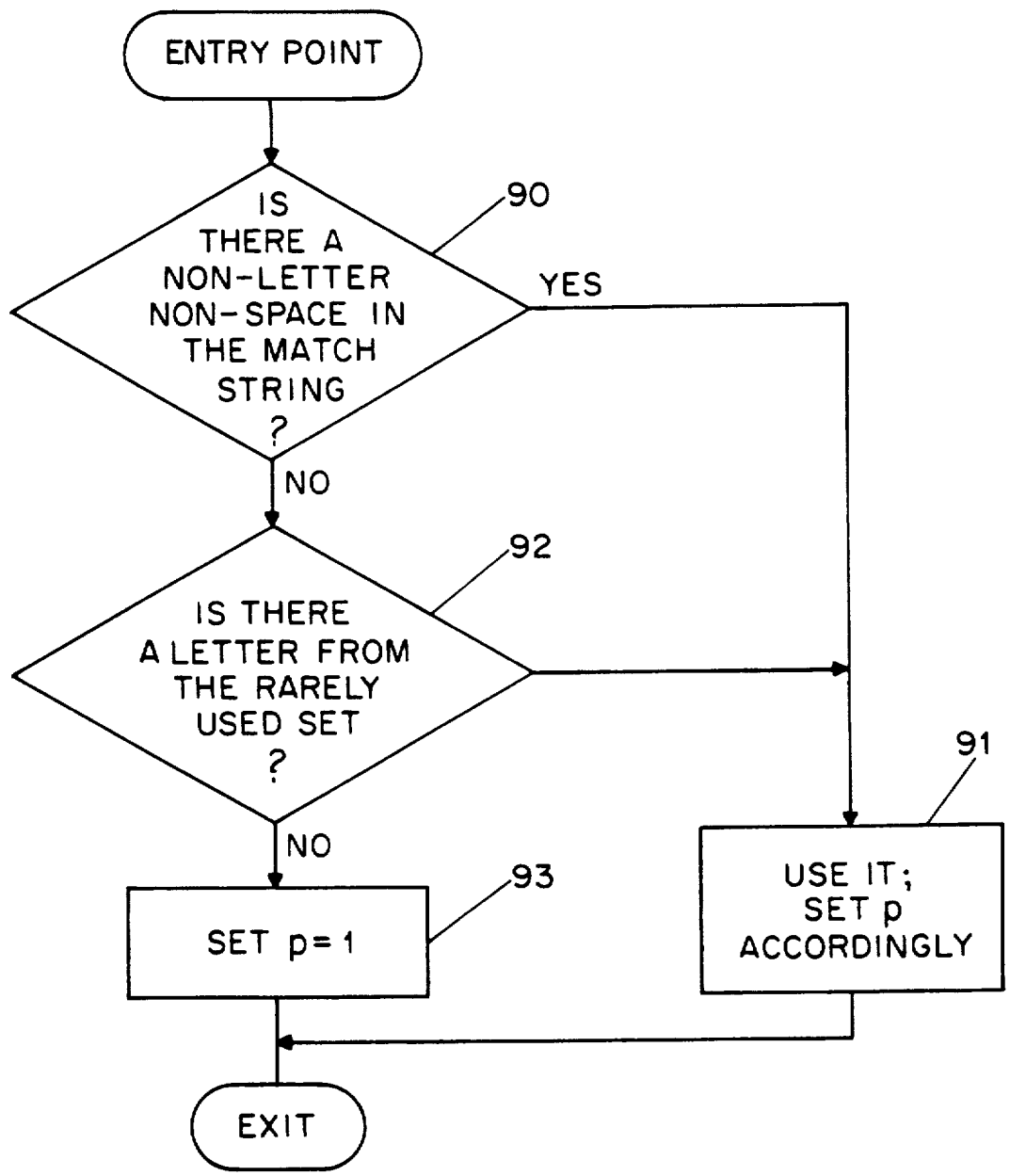
FIG. 6 in flowchart form an exemplary selection routine for selecting a character from a match string.

FIG. 6 shows in flowchart form an exemplary embodiment of the selection procedure of block 69. In this embodiment, it is assumed that the match string has already been determined (e.g. by user entry at the keyboard). Starting with p=0, p is incremented repeatedly and the p-th characters inspected to see if it is a non-space non-letter. This is shown in block 90. If so, that determines p, as shown in block 91.

Otherwise execution proceeds to block 92, where p is again zeroed and incremented repeatedly to determine whether the p-th letter is in the predetermined set of rarely used letters. If so, that determines p. If not, then p is arbitrarily set equal to 1 in block 93.

While the steps of FIG. 6 clearly take some nonzero time to execute, it bears observing that the time cost is incurred only once per search, and the benefit is a faster search through what may be millions of character positions.

The routine of FIG. 6 could be simplified and nonetheless offer benefits in accordance with the invention. For example, block 92 could be eliminated since just avoiding the case conversions of block 77 in FIG. 5 saves time.

For searches that have been selected by the user as case-sensitive (i.e. blocks 76 and 77 are skipped in FIG. 5) the test of block 90 could be omitted and the test of block 92 retained, which would save time over the prior art case-sensitive search.

The method of the invention, while discussed at greatest length with respect to the benefits it offers to word processors, also offers great benefits to other applications. For example, it is commonplace to use a test-search application to try to find a match string anywhere in any file on a disk. Such an application can take many minutes to run when searching the entirety of a disk. Experimentation has shown that the method of the invention beats prior art disk text-search applications by up to one-third of the prior art search duration.

As will be appreciated by those skilled in the art, where the file to be searched is not text, but is arbitrary data, the method of the invention offers no particular advantage. But for the computation of block 69, however, the method of the invention at least takes no longer than the prior art methods even for such arbitrary data. That is, if the method of the invention were employed, even to the exclusion of the prior art methods it never takes longer than before and is sometimes faster. Sometimes it is much faster.

One skilled in the art will appreciate that while the inventive text searching has been described with respect to a particular embodiment, namely a general purpose stored program computer with the file to be searched located on a hard disk, the invention may equally well be practices differently. For example, the file to be searched may be in RAM or on other storage media including compact disk (CD) ROM.

As mentioned disk, one skilled in the art will appreciate that the search, though described here and below as a search of the entire file starting at the beginning, could equally well be initiated from the current cursor position which might be anywhere in the file. One skilled in the art will also appreciate that the search may be a repetitive one, finding a match, recording the location of the match, finding another match, and so on. The teachings of the invention benefit all these variants of searching.

I claim:

1. In a computer having memory, and having a file within the memory, an improved text-search method for searching for a string within the file, said string having a length of f characters, f being a number greater than one, comprising the steps of:

locating within the string a located character within the string that satisfied a predetermined condition, the location of said located character defining a first position p within the string;

scanning within the file for an occurrence of a match between the located character and a character within the file in a range of positions no closer than p characters to the start of the file and no closer than 1+p−p characters to the end of the file, and terminating the text-search if no occurrence is found;

inspecting the contents of the file from a position p-1 characters preceding the occurrence to a position f-p characters following the occurrence for a match with the string, reporting a successful search at the position p-1 characters preceding the occurrence in the event of a match, and otherwise repeating the scanning step.

2. The improved text-search method of claim 1 wherein the predetermined condition comprises a condition that the located character be non-alphabetic if there is at least one non-alphabetic character in the string.

3. The improved text-search method of claim 1 wherein the file and the string are text in a language and the predetermined condition comprises a condition that the located character located is less frequently used in the language than at least one other character in the string.

4. The improved text-search method of claim 1 wherein the file and the string are text in a language and the predetermined condition comprises a condition that the located character located is within a predetermined set of characters less frequently used in the language if there is at least one character from within the predetermined set in the string.

5. Text-search apparatus for finding a string of characters within a file of characters, the number of characters in the string being greater than 1 and the number of characters in the string defining an integer f, the apparatus comprising:

a processor;

a memory storing the file and the string;

a parallel data bus operatively connecting the processor and the memory;

means for locating within the string a located character within the string that satisfies a predetermined condition, the location of said location character defining a first position p within the string;

means responsive to the located character for scanning within the file for an occurrence of a match between the located character and a character within the file in a range of positions no closer than p characters to the start of the file and no closer than 1+f−p characters to the end of the file;

means responsive to the occurrence for inspecting the contents of the file from a position p-1 characters preceeding the occurrence to a position f-p characters following the occurrence for a match with the string; and means responsive to the match for reporting a successful search at the position p-1 characters preceding the occurrence.

6. The improved text-search apparatus of claim 5 wherein the predetermined condition comprises a condition that the located character be non-alphabetic if there is at least one non-alphabetic character in the string.

7. The improved text-search apparatus of claim 5 wherein the file and the string text in a language and the predetermined condition comprises a condition that the located character located is less frequently used in the language than at least one other character in the string.

8. The improved text-search apparatus of claim 5 wherein the file and the string are text in a language and the predetermined condition comprises a condition that the located character located is within a predetermined set of characters less frequently used in the language if there is at least one character from within the predetermined set in the string.

* * * * *